Figure 1:
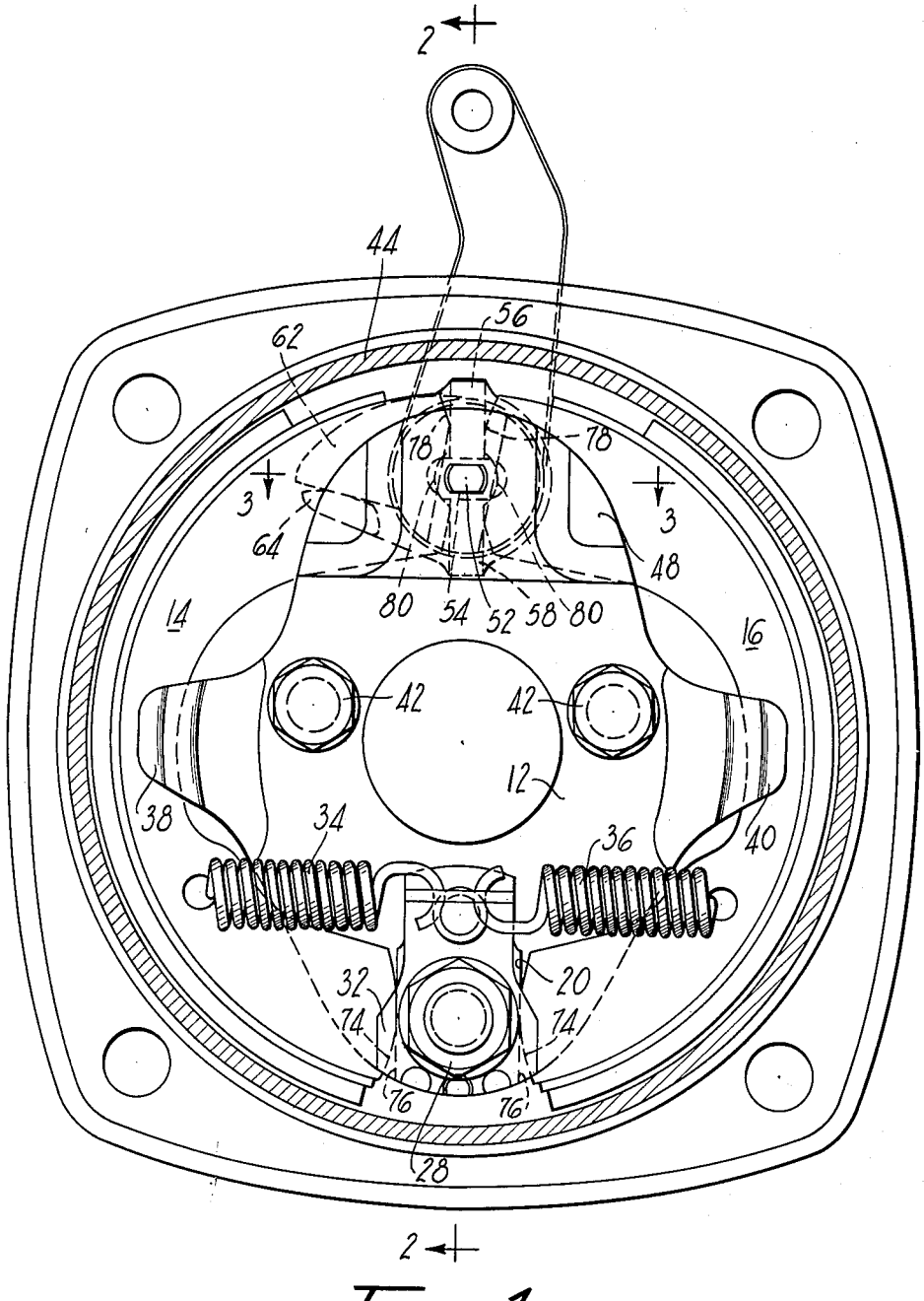

Dec. 27, 1955     E. K. DOMBECK     2,728,418
BRAKE

Filed March 3, 1948     2 Sheets-Sheet 1

INVENTOR.
EDWARD K. DOMBECK
BY
T. J. Plante
ATTORNEY

Dec. 27, 1955  E. K. DOMBECK  2,728,418
BRAKE
Filed March 3, 1948  2 Sheets-Sheet 2
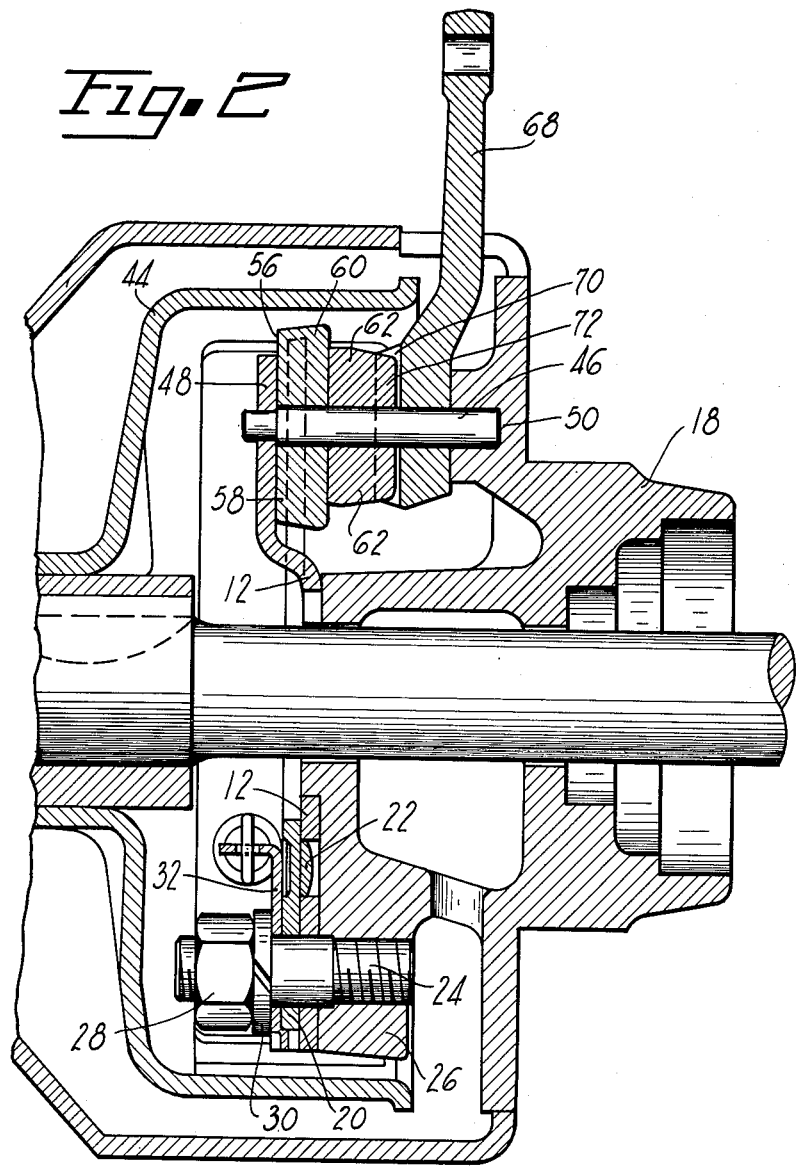
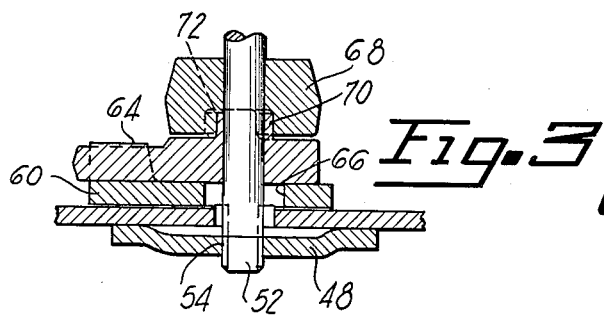
INVENTOR.
EDWARD K. DOMBECK
BY
T. J. Plante
ATTORNEY

United States Patent Office 2,728,418
Patented Dec. 27, 1955

2,728,418

BRAKE

Edward K. Dombeck, South Bend, Ind., assignor to Bendix Aviation Corporation, South Bend, Ind., a corporation of Delaware Application March 3, 1948, Serial No. 12,760

8 Claims. (Cl. 188—78)

This invention relates to improvements in brakes and has among its objects: (1) To provide an improved construction and arrangement of a non-servo brake, i. e., a brake in which both shoes anchor at one side of the brake and are actuated at the other side; (2) to provide an improved brake-actuating mechanism consisting of a plurality of coacting levers; and (3) to provide a novel and improved mounting arrangement for the anchor member of the brake.

Other objects and advantages of the present invention will become apparent during the following description of an illustrative embodiment of the invention, reference being had therein to the accompanying drawings, in which:

Figure 1 is an elevational view of brake assembly embodying the invention; and

Figures 2 and 3 are sectional views taken on the lines 2—2, and 3—3, respectively, of Figure 1.

Referring to the drawings, a supporting member, or spider plate, 12 has mounted thereon two T-section brake shoes 14 and 16, and is secured to a non-rotating member, such as the bearing carrier 18. Although the present invention is generally applicable to all brakes, regardless of the use for which they are intended, the illustrated version is particularly adapted to serve as a brake on a farm tractor. On a vehicle of this type, the bearing carrier 18 is itself secured to the differential housing.

The brake shoes 14 and 16 are arranged to anchor against the opposite sides of an anchor plate 20. The anchor plate 20 lies against the surface of the supporting plate 12, as shown in Figure 2. In order to secure the anchor plate to the supporting plate while the brake is being assembled, it is spot-welded thereto, a locating nib 22 extending into an opening in the supporting plate to hold the anchor plate in position during the welding operation.

Resistance to the brake torque which the shoes transmit to the anchor plate is provided by the large mounting stud 24, which not only secures the anchor plate to the supporting plate, but also secures the latter to mounting flange 26 of bearing carrier 18. The parts are held in assembled position by nut 28 and lock washer 30, a plate 32 being secured between the lock washer and the anchor plate to serve the dual purpose of guiding the lower ends of the brake shoes and retaining the inner ends of the two shoe return springs 34 and 36.

In addition to being guided by plate 32, the brake shoes 14 and 16 are centrally guided by arms 38 and 40 formed on supporting plate 12 and bent away from the plane of the supporting plate in such a way as to support the shoe webs between the arms and the body of the plate. In order to secure the supporting plate to bearing carrier 18, two threaded fastening members 42 are provided in addition to the anchor mounting stud 24.

In order to spread the unanchored ends of the brake shoes to bring the shoes into engagement with the brake drum 44, actuating mechanism is provided between the upper ends of the shoes. A pivot pin 46 has one end supported in an arm 48 of supporting plate 12 and the other end supported in a flange 50 formed on bearing retainer 18, the pivot pin being prevented from turning by engagement of its outer end 52, which has flattened sides as shown in Figure 1, with a similarly-shaped opening 54 in arm 48 of plate 12.

The upper ends of the brake shoes are spread by lugs 56 and 58 provided on a floating lever 60, which in turn is actuated by an intermediate lever 62 acting against a lug 64 formed on floating lever 60. Lever 60 is supported vertically by pivot pin 46, but it has an oblong slot 66 which permits shifting movement of lever 60 when the brake shoes are being spread.

Intermediate lever 62 is actuated by an operator operated lever 68. Both intermediate lever 62 and operator operated lever 68 are pivoted on pivot pin 46. Lever 68 has a diametric slot 70 which receives a diametral ridge 72 formed on intermediate lever 62. Therefore, rotation of lever 68 causes rotation of lever 62. Levers 68 and 62 could be formed as a single member. However, the ridge and slot connection is provided in order that different angular settings of lever 68 in released position can be provided for different vehicles by simply forming the slots 70 at different angles in the forgings which constitute the levers 68.

The brake shoes 14 and 16 are so constructed and arranged as to compensate for any eccentricity of the shoe with respect to the drum by sliding movement of the shoes on the anchor plate. The lower ends of the shoes have convexly curved anchoring surfaces 74 which engage the flat sides 76 of the anchor plate. The upper ends of the shoes have convexly curved surfaces 78 which engage the flat sides of lugs 56 and 58 in released position. The upper ends of the shoes also have notches 80 formed therein to clear pivot pin 46, thereby permitting the shoes to shift up or down without engaging the pivot pin.

In operation, rotation of lever 68 in the counterclockwise direction (as seen in Figure 1) causes lever 62 to rotate in the same direction, moving floating lever 60. Lug 56 of lever 60 acts against shoe 14 and lug 58 of lever 60 acts against shoe 16 to spread the shoes, and thereby apply the brake. Anchoring torque of the primary shoe is transmitted through anchor plate 20 and mounting stud 24 to the non-rotating member 26.

Although a particular embodiment of my invention has been described, it will be understood by those skilled in the art that the objects of the invention may be attained by the use of constructions different in certain respects from that disclosed without departing from the underlying principles of the invention.

I claim:

1. A brake, arranged to be mounted on a non-rotating member, comprising a supporting member, an anchor plate, a fastening member securing the anchor plate to the supporting member and securing the supporting member to the non-rotating member, additional fastening members securing the supporting member to the non-rotating member, two T-section brake shoes each having one end in sliding engagement with the anchor plate, return spring means acting to maintain such engagement but allowing the anchored shoe ends to assume different adjusted positions on said anchor plate, an actuator pivot pin located between the unanchored ends of the shoes and having one end supported by the supporting member and the other end supported by the non-rotating member, a floating lever having shoe-actuating lugs extending between the ends of the shoes, said lever being supported by the pivot pin but being capable of shifting movement with respect to the pin when the shoes are being spread, an intermediate lever which is pivoted on the pin and which has an arm engaging the floating lever to actuate the same, said intermediate lever having a diametral ridge formed thereon, and an operator operated lever also pivoted on the pin and having a diametral slot into which extends the ridge formed on the intermediate lever.

2. A brake, arranged to be mounted on a non-rotating member, comprising a supporting member, an anchor on the supporting member, two brake shoes each having one end in sliding engagement with the anchor, an actuator pivot pin located between the unanchored ends of the shoes and having one end supported by the supporting member and the other end supported by the non-rotating member, a floating lever having shoe-actuating lugs extending between the ends of the shoes, said lever being supported by the pivot pin but being capable of shifting movement with respect to the pin when the shoes are being spread, an intermediate lever which is pivoted on the pin and which has an arm engaging the floating lever to actuate the same, said intermediate lever having a diametral ridge formed thereon, an operator operated lever also pivoted on the pin and having a diametral slot into which extends the ridge formed on the intermediate lever, and return spring means urging said shoes into engagement with said anchor and allowing said shoes to assume different adjusted positions with respect thereto.

3. A brake, comprising two brake shoes, an actuator pivot pin located between the unanchored ends of the shoes, a floating lever having shoe-actuating portions which slidingly engage the ends of the shoes, an intermediate lever which is pivoted on the pin and which engages the floating lever to actuate the same, said intermediate lever having a ridge formed thereon, and an operator operated lever also pivoted on the pin and having a slot into which extends the ridge formed on the intermediate lever.

4. A brake, comprising two brake shoes, an actuator pivot pin located between the shoes, an actuating lever which is pivoted on the pin and which is operatively connected to the shoes to actuate the same, said actuating lever having a ridge formed thereon, and an operator operated lever also pivoted on the pin and having a slot into which extends the ridge formed on the actuating lever.

5. A brake, arranged to be mounted on a non-rotating member, comprising a supporting member, means securing the supporting member to the non-rotating member, two brake shoes, an actuator pivot pin located between the unanchored ends of the shoes and having one end supported by the supporting member and the other end supported by the non-rotating member, a floating lever having shoe-actuating lugs extending between the ends of the shoes, said lever being supported by the pivot pin but being capable of shifting movement with respect to the pin when the shoe ends are being spread, an intermediate lever which is pivoted on the pin and which has an arm engaging the floating lever to actuate the same, said intermediate lever having a diametral ridge formed thereon, and an operator operated lever also pivoted on the pin and having a diametral slot which extends over the ridge formed on the intermediate lever.

6. A brake, arranged to be mounted on a non-rotating member, comprising a supporting member, means securing the supporting member to the non-rotating member, two brake shoes, an actuator pivot pin located between the unanchored ends of the shoes and having one end supported by the supporting member and the other end supported by the non-rotating member, a floating lever having shoe-actuating lugs extending between the ends of the shoes and having a radially outwardly extending abutment, said lever being supported by the pivot pin but being capable of shifting movement with respect to the pin when the shoe ends are being spread, an intermediate lever which is pivoted on the pin and which has an arm engaging the abutment to actuate said floating lever, and said intermediate lever being operatively connected to an operator operated lever.

7. A brake, arranged to be mounted on a non-rotating member, comprising a supporting member, two brake shoes, an actuator pivot pin located between the unanchored ends of the shoes and having one end supported by the supporting member and the other end supported by the non-rotating member, a floating lever having shoe-actuating lugs extending between the ends of the shoes, said lever being supported by the pivot pin but being capable of shifting movement with respect to the pin when the shoes are being spread, an intermediate lever which is pivoted on the pin and which has an arm engaging the floating lever to actuated the same, said intermediate lever having a diametral ridge formed thereon, and an operator operated lever also pivoted on the pin and having a diametral slot into which extends the ridge formed on the intermediate lever.

8. A brake, comprising two brake shoes, an actuator pivot pin located between the unanchored ends of the shoes, a floating lever having shoe-actuating portions which slidingly engage the ends of the shoes, an intermediate lever which is pivoted on the pin and which engages the floating lever to actuate the same, and an operator operated lever also pivoted on the pin and being operatively connected to the intermediate lever.

References Cited in the file of this patent

UNITED STATES PATENTS

| Re. 18,966 | Lauer | Oct. 10, 1933 |
| Re. 19,012 | Poulet | Nov. 28, 1933 |
| 1,789,448 | Parker et al. | Jan. 20, 1931 |
| 1,829,307 | Sneed | Oct. 27, 1931 |
| 1,851,737 | Stoner | Mar. 29, 1932 |
| 1,908,459 | Thomas | May 9, 1933 |
| 1,919,882 | Evans | July 25, 1933 |
| 2,006,522 | Stoner | July 2, 1935 |
| 2,074,725 | Goepfrich | Mar. 23, 1937 |
| 2,111,503 | Axtmann | Mar. 15, 1938 |
| 2,167,607 | Alden | July 25, 1939 |
| 2,481,144 | Neale | Sept. 6, 1949 |
| 2,544,030 | House | Mar. 6, 1951 |

FOREIGN PATENTS

| 255,599 | Great Britain | July 29, 1926 |
| 580,588 | Great Britain | Sept. 12, 1946 |